Oct. 19, 1943.　　　　C. FIELD　　　　2,332,211
EXTRUDER
Filed April 14, 1939　　　4 Sheets-Sheet 1
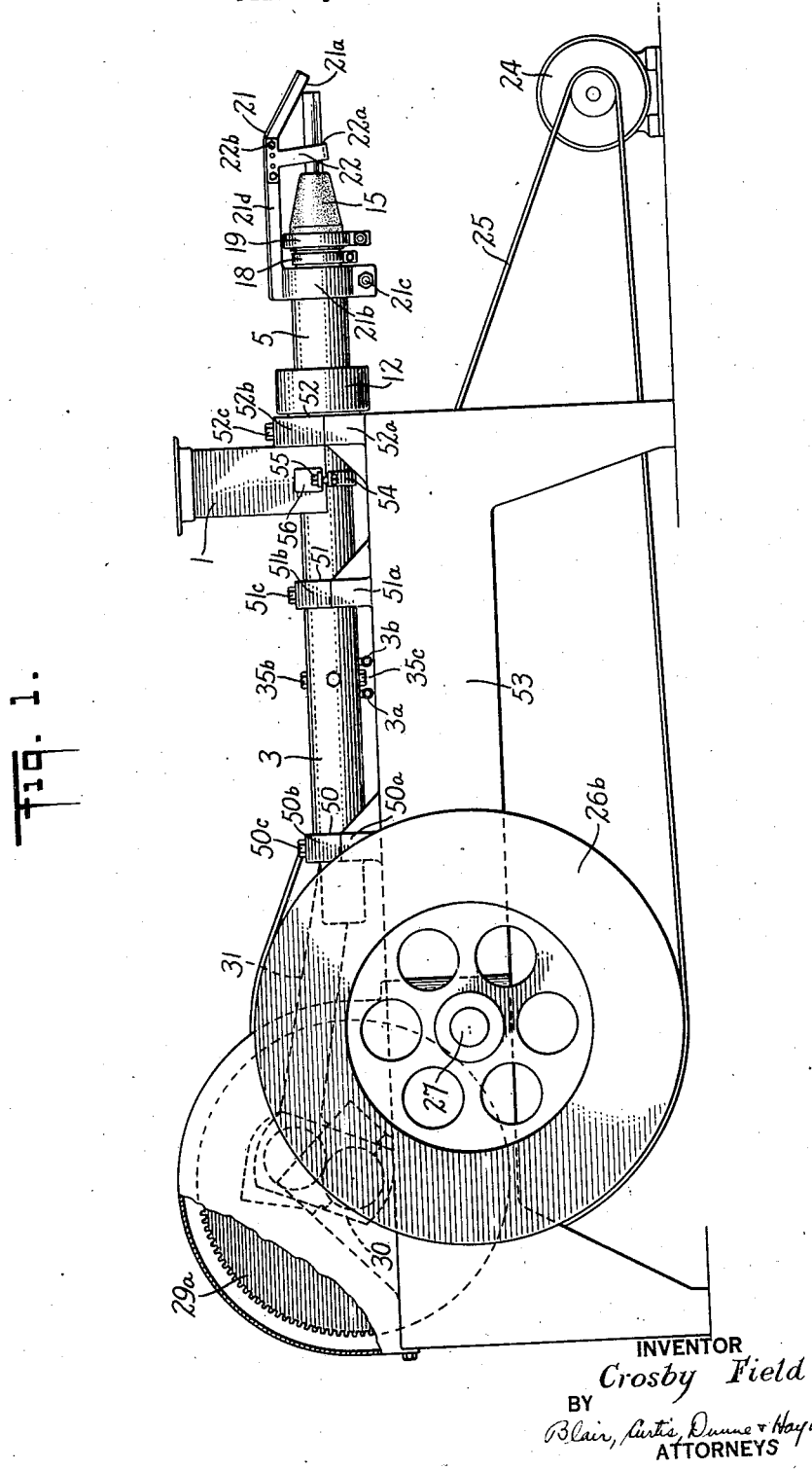
INVENTOR
Crosby Field
BY
Blair, Curtis, Dunne & Hayward
ATTORNEYS

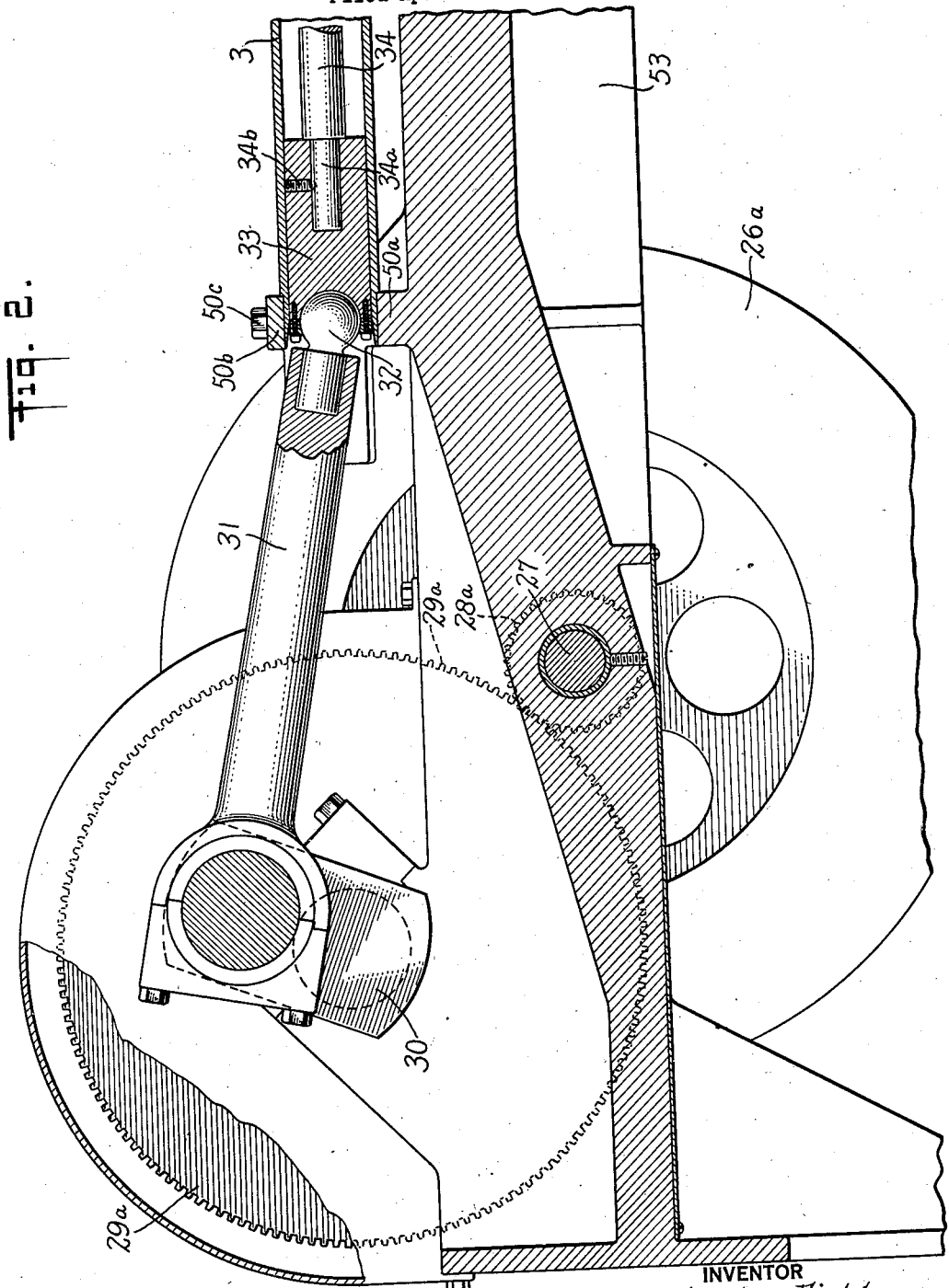

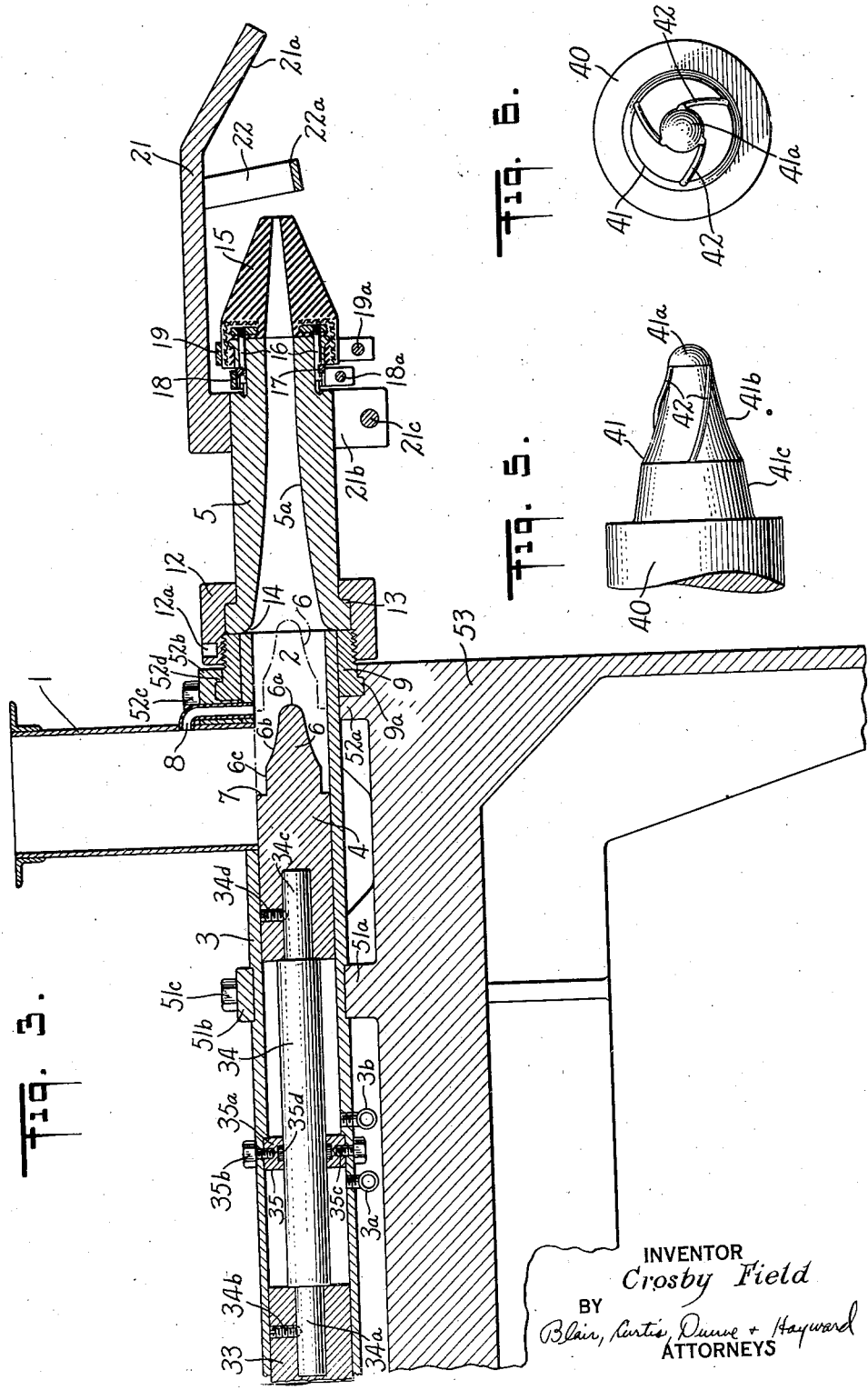

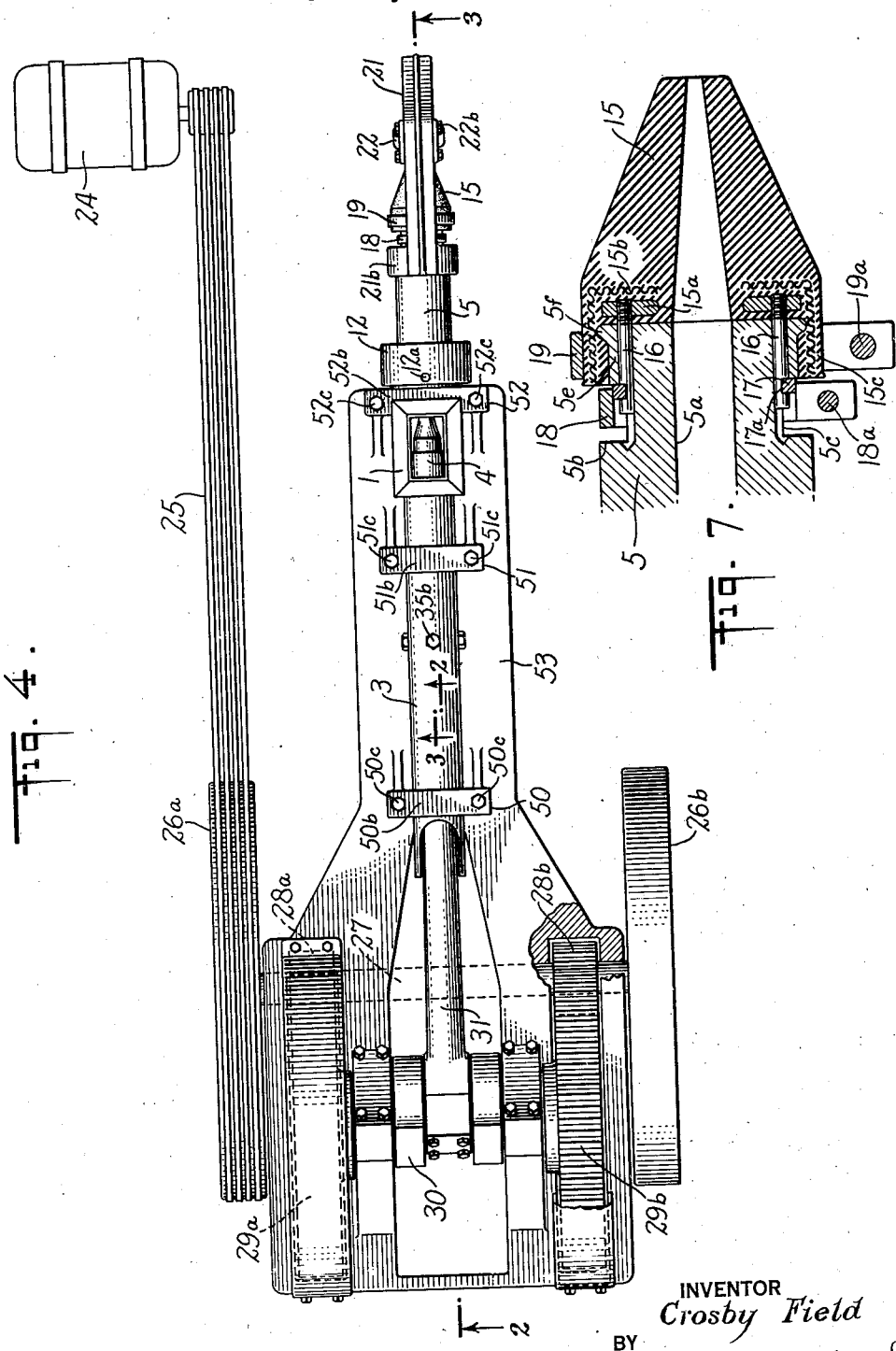

Patented Oct. 19, 1943

2,332,211

UNITED STATES PATENT OFFICE 2,332,211

EXTRUDER

Crosby Field, Brooklyn, N. Y., assignor to Flakice Corporation, Brooklyn, N. Y., a corporation of Delaware Application April 14, 1939, Serial No. 267,948

14 Claims. (Cl. 18—12)

This invention relates to a method of and apparatus for converting fragments of frozen fluid into a solid mass, and more particularly to a method and apparatus for welding or fusing such fragments into a solid, homogeneous rod or bar substantially free from undesirable internal stresses and having appreciable mechanical strength.

It is well-known in the art that the manufacture of ice or other frozen fluid in the form of thin sheets which may be subsequently broken up into fragments rather than in the form of large cakes may result in important operating advantages. Among these advantages might be mentioned decreased space required for refrigerating equipment, increased yield of frozen product per unit of refrigeration, decreased labor cost, and continuity and flexibility of production. Such fragments may be manufactured by any of various proposed methods, such as, for example, that disclosed in my Patent No. 2,005,734. However, for certain purposes it is desirable that ice be available in pieces somewhat larger than those produced by using the method disclosed in the above-mentioned patent. Thus, I have found that ice made in the form of a rod or cylinder of a length one or more times its diameter is particularly well-adapted for packing certain perishable foodstuffs, refrigerating car bunkers and the like. It is to be understood that the cross-section of the rod need not be round, but may be of any convenient shape, such as square, oval, or the like. Many attempts have been made heretofore to compress or weld fragments of ice into small cakes or briquettes and in general such cakes or briquettes have been subject to one or more of the following disadvantages. In many cases they are relatively soft in consistency and when placed in a storage bin tend to stick together; in other cases the briquettes while relatively hard have been formed in such a manner that they contain internal stresses which cause them to shatter when subjected to a relatively slight shock; in still other cases, portions of the cake or briquette will be hard and other portions soft.

The present invention provides a method and apparatus for converting such fragments into a solid bar or rod which is uniform and homogeneous throughout, and which is substantially free from undesirable internal stresses which would otherwise cause it to crack. The many objects and advantages of the present invention may best be appreciated by referring to the accompanying drawings which illustrate one embodiment of the invention, and wherein:

Figure 1 is a general elevation view of a machine embodying the present invention;

Figure 2 is a vertical section on line 2—2 of Figure 4, showing the driving mechanism;

Figure 3 is a vertical section on line 3—3 of Figure 4;

Figure 4 is a top plan view of the machine;

Figure 5 is a side elevation view of an alternate construction of the plunger; and Figure 6 is an end view of the plunger shown in Figure 5; and Figure 7 is a detail view of the discharge end of the nozzle shown in Figure 3.

The apparatus shown comprises in general a suitably driven reciprocating plunger which forces the fragments into and through a nozzle to compress and weld them into a solid bar or rod. Referring particularly to Figure 3, the fragments enter the apparatus at the top of the chute 1, which is of rectangular cross-section, and pass downwardly into a plunger chamber 2 within the cylindrical barrel 3. The fragments may be fed to the chute 1 by any suitable feeding device (not shown). Within the plunger chamber 2 there is provided a plunger 4 which is preferably made of bronze or other rust-resisting material and which is caused to reciprocate by mechanism described in detail below. Periodically the plunger 4 moves forward (to the right, as shown in Figure 3) to force the fragments in plunger chamber 2 into the large end of a rigid converging nozzle 5 and at the same time to compress and weld the fragments into a solid mass.

As shown in the drawings, the tapered inner surface 5a of the nozzle 5 is made with a slight inward bulge. My experiments have indicated that when the tapered inner surface of the nozzle is straight, the rod of ice formed is subject to "checking," that is, that internal shearing stresses are set up within the rod which may cause it to shatter along cross-sectional planes when subjected to a relatively slight shock, the precise shape and characteristics of the fracture being dependent to some extent upon the shape of the plunger used. This tendency towards "checking" is largely obviated by making the inner surface of the nozzle convex.

The plunger 4 is provided with a head 6 which, as shown in the drawings, has a hemispherical leading surface 6a merging into a principal bearing surface 6b which is concavo-conical in shape. The bearing surface 6b in turn merges into a relatively short straight conical surface 6c extending to the vertical shoulder 7 of the plunger 4. In the apparatus here illustrated the ratio of the radius of convex curvature of the inner surface 5a of the nozzle 5 to the radius of concave curvature of the bearing surface 6b is approximately 14 to 1. Whereas this ratio may be varied a relationship of this general order was shown by experiment to result in the production of a rod of ice which would not shatter undesirably when subjected to shocks normally encountered in use.

In the embodiment here shown, the head 6 is shaped in such a manner that the ice fragments fed through chute 1 are first forced outwardly against the inner surface of the barrel 3 and of the nozzle 5 as the plunger advances. All portions of the concavo-conical surface 6b form an angle of somewhat less than 45 degrees with the horizontal and hence the vertical or radial component of the force exerted on the ice fragments is greater than the horizontal or axial component. Thus the ice is subjected to a compressive stress which is greater than that necessary merely to force it through the nozzle. During the later stages of the forward movement of the plunger the horizontal component of the force exerted is increased by the action of the shoulder 7 and the mass of ice already compressed moves forward in the nozzle.

As the plunger 4 moves forward, air which enters the plunger chamber 2 with the fragments passes out of the chamber 2 and back into the chute 1 through a tube 8. The extreme forward position of the plunger 4 is indicated in dotted lines in Figure 3, and as shown the tube 8 is only partially closed off when the plunger is in its extreme forward position. Thus, the tube 8 not only aids in removing air and any liquid carried in with the fragments but relieves the vacuum which would otherwise be created by the recession of the plunger 4.

Referring to Figures 1 and 3, the barrel 3 is mounted on the supports 50, 51, and 52, which are in turn mounted on the base 53. The support 50 is a split ring comprising a lower half 50a and an upper half 50b, the two halves of the split ring being secured together by a pair of bolts 50c (best shown in Figure 4). The support 51 is constructed in a similar manner and comprises a lower section 51a which is secured to an upper section 51b by a pair of bolts 51c. As shown in Figures 2 and 3, the barrel 3 is notched to receive the two halves of the split rings 50 and 51 to hold the barrel securely against any tendency toward axial movement.

Referring again to Figure 1, the chute 1 is secured to the barrel 3 by a semicircular band 54 which passes under the barrel and is secured by the bolts 55 to a pair of struts 56 attached to opposite sides of the chute. The support 52, like the supports 50 and 51, is a split ring comprising a lower section 52a and an upper section 52b secured together by the bolts 52c. However, as shown in Figure 3, its construction is somewhat different. The lower section 52a of the support 52 is cut away to receive the shoulder 9a of a ring 9, which fits snugly around the end of the barrel 3. Above the barrel 3, the shoulder 9a engages a similar shoulder 52d of the section 52b, and is held in place thereby. Thus the two halves 52a and 52b of the support 52 prevent axial movement of the ring 9.

A portion of the outer periphery of the ring 9 is threaded to receive a threaded collar 12 which bears against a shoulder 13 of the nozzle 5 to hold the nozzle firmly against the barrel 3. The collar 12 is provided with a shallow hole 12a into which a spanner wrench may be fitted to aid in loosening or tightening the collar.

The inner surface of the nozzle 5 at its left-hand end is recessed to provide a declivity 14 which serves to prevent the mass of ice within the nozzle from receding when the plunger 4 is withdrawn. During the forward stroke of the plunger ice is forced into the declivity to form a projection in the shape of an annular ring extending outwardly from the central mass of ice and when the plunger recedes the projection bears against the vertical surface of the declivity 14 to hold the mass of ice in place.

The nozzle 5 at its discharge end is provided with an expansible plug or auxiliary nozzle 15, preferably made of rubber, which holds the fragments back in the nozzle until they have been compressed into a solid mass. When a solid mass of ice has been formed within the nozzle, a rod of ice forces its way through the plug, expanding the interior channel of the plug to the diameter of the small end of the nozzle. Since it is made of relatively stiff rubber, the plug when expanded exerts an appreciable retarding influence on the movement of the rod of ice. It should be noted that the rubber plug throughout its entire length bears against the rod of ice.

The plug 15 is secured to the nozzle 5 in the following manner:

Referring to Figure 7, the nozzle 5, near its discharge end, is cut away to form an annular channel bounded by the vertical surface 5b, the cylindrical surface 5c, and the shoulder 5e of the nozzle 5. The rubber nozzle 15 has molded therein a ring 15a which threadably receives a plurality of stud bolts 16 that pass through a corresponding series of holes bored in the shoulder 5e of the nozzle 5. The axes of the stud bolts coincide with elements of the cylindrical surface 5c; that is, the bolts 16 intercept the cylindrical surface 5c and hence the bore through the shoulder 5e is extended to the surface 5b. The stud bolts 16 are cut away to receive a split ring 17, the depth of the cutout being such that the inner surface 17a of the ring 17 fits snugly against the cylindrical surface 5c, and the position of the cutout being such that the ring 17 fits snugly against the shoulder 5e of the nozzle 5. The split ring 17 is held in place by a clamping band 18 which passes around the outer periphery of the ring 17, and is secured by the bolt 18a. The large end of the rubber nozzle 15 is molded in such a manner as to form a flap 15c which fits over the shoulder 5e and a lip 5f of the nozzle 5. A clamping band 19 passes around the outer periphery of the flap 15c and is secured by a bolt 19a. The nozzle 15 is provided with a piece of reinforcing fabric 15b molded therein, which aids in preventing tearing of the rubber. Thus the construction is such that the force tending to push the rubber nozzle 15 away from the rigid nozzle 5 is distributed throughout the cross-section of the rubber nozzle.

Referring now to Figure 1, the rod of ice as it emerges from the plug 15 is broken up into sections of the desired size. This is accomplished by causing the rod to bear against the diagonal surface 21a of a breaker arm 21 which is mounted on the nozzle 5 by means of a clamp ring 21b which passes around the nozzle 5 and is secured by the bolt 21c. The diagonal surface 21a causes the rod to be forced downwardy against a rigid fulcrum 22a supported by the fulcrum piece 22. The fulcrum piece 22 is secured to the breaker arm 21 by the bolt 22b, and additional bolt holes are provided in the web 21d of the breaker arm 21 so that the position of the fulcrum piece 22 with respect to the breaker arm 21 may be adjusted to vary the size of the sections broken off.

Mechanism for operating the plunger 4 will now be described. Referring to Figures 1 and 4 there is shown an electric motor 24 which is connected by a suitable belt 25 with one of a pair of flywheels 26a and 26b mounted on opposite ends of a shaft 27. Also mounted on shaft 27 is a pair of pinions 28a and 28b which cooperate with a pair of gears 29a and 29b mounted on opposite ends of a crankshaft 30. Referring now to Figure 2, the crankshaft 30 is connected by the connecting rod 31 and ball and socket bearing 32 to the cross-head 33 within the barrel 3. Thus the motor 24 operates to produce a reciprocating motion of the cross-head 33.

Referring again to Figure 3, the cross-head 33 and plunger 4 are interconnected by the plunger rod 34 in the following manner:

An extension 34a on one end of the rod 34 fits into a bore in the cross-head 33 and is held in place by a set screw 34b. A similar extension 34c at the opposite end of the plunger rod 34 fits into a bore in the plunger 4 and is held in place by the set screw 34d. The plunger rod 34 passes through a packing gland 35 comprising the wiper ring 35a held in place by the bolts 35b and 35c, which pass through the wall of the barrel 3, and a felt gasket 35d which is fitted into an annular cutout space in the wiper ring 35a. The mechanism to the right of the packing gland 35 is water-lubricated and that to the left of the packing gland is oil-lubricated. The function of the packing gland is to keep the oil and water from intermixing and insure adequate lubrication of all the moving parts of the apparatus.

On each side of the packing gland 35 there are provided in the barrel 3 the air holes 3a and 3b. These air holes permit intake and discharge of air as the plunger 4 and cross-head 33 advance and recede, and also allow any lubricant which leaks past the plunger or cross-head to drain off.

Due to the fact that the chips are fed at the top of the machine and pass into the plunger chamber at a single point on the periphery of the plunger, there is in some cases a tendency for the plunger 4 to wear unevenly. In such cases if the uneven wear is excessive, the modified form of plunger shown in Figures 5 and 6 may be used. Referring to Figures 5 and 6, the head 41 of the plunger 40 has a hemispherical leading surface 41a and bearing surfaces 41b and 41c similar to the surfaces 6a, 6b, and 6c of the plunger 4. The surface 41b is provided with a plurality of helical strips or vanes 42 which, as the plunger moves forward into the mass of ice, cause the plunger to rotate. When the plunger recedes it will be rotated in the opposite direction, but the degree of rotation will not be the same and hence the net effect of both operations will be that the plunger will gradually be rotated in the barrel 3. In this way uneven wear on the surface of the plunger and on the barrel 3 is avoided.

From the above description it is apparent that the present invention provides a simple and economical method and apparatus for converting fragments of frozen fluid into a solid bar or rod which may be broken up into convenient lengths. The machine will operate on either dry or wet ice and a dense compact homogeneous mass is produced which is substantially free from undesirable internal stresses. The opacity or cloudiness of the rod is a function both of the cloudiness of the fragments fed to the machine and of the rate at which the machine is operated. If the machine is operated at moderate speeds the opaqueness of the rod will be somewhat less than the opaqueness of the fragments fed. In practice, however, cloudiness of the rod is not considered objectionable so long as the mechanical strength of the rod is unimpaired.

Since many embodiments might be made of the present invention and many changes might be made in the embodiment here described, it is to be understood that the above description is to be interpreted as illustrative only and not in a limiting sense.

I claim:

1. Apparatus for converting fragments of frozen liquid into a solid bar, which comprises, in combination, a nozzle with a convex inner surface from which the said fragments are extruded as a solid bar, a concavo-conical plunger for forcing said fragments into the said nozzle to converting them into a solid mass and means for maintaining sufficient force opposing the ejection of said bar from said nozzle to ensure sufficient force being built up in said nozzle to form said fragments into a solid mass.

2. Apparatus for converting fragments of an ice into a solid bar, which comprises, in combination, a rigid nozzle with a convex inner surface through which the said fragments are extruded to form a solid bar, a concavo-conical plunger for forcing the fragments into the said rigid nozzle to convert them into a solid bar, and an expansible nozzle associated with said rigid nozzle and normally having a cross-sectional area less than the cross-sectional area of the discharge end of said rigid nozzle for frictionally exerting a retarding influence on the movement of the said bar after extrusion.

3. Apparatus for converting fragments of frozen liquid into a solid mass, which comprises, in combination, a converging nozzle having a curved iner surface, and a tapered plunger having a curved outer surface, the radius of curvature of said plunger being less than the radius of curvature of the inner surface of said nozzle.

4. Apparatus for converting fragments of frozen liquid into a solid mass, which comprises, in combination, a converging nozzle through which said mass is extruded, means for forcing the fragments into the said nozzle to convert them into a solid mass, comprising a tapered plunger having a convex leading surface merging into a concavo-conical bearing surface.

5. Apparatus for converting fragments of frozen liquid into a solid mass, which comprises, in combination, a nozzle through which said mass is extruded, water-lubricated means for intermittently forcing said fragments into said nozzle to convert them into a solid mass, oil-lubricated means for operating said intermittent means, and means for preventing oil from said oil-lubricated means from intermixing with water from said water-lubricated means.

6. Apparatus for converting fragments of frozen liquid into a solid mass, which comprises, in combination, a rigid nozzle through which the said mass is extruded, a rubber nozzle at the discharge end of said rigid nozzle, and means for connecting said rubber nozzle to said rigid nozzle including a plurality of stud bolts integral with said rubber nozzle passing through a portion of said rigid nozzle and held in place by a clamp ring.

7. Apparatus for converting fragments of frozen liquid into a solid bar, which comprises, in combination, a converging nozzle through which said bar is extruded, means for forcing said fragments into said nozzle to convert them into a solid mass, and a rubber nozzle associated with said rigid nozzle and having an interior bore normally smaller than the smallest diameter of said rigid nozzle.

8. Apparatus for converting fragments of an ice into a solid mass, which comprises, a converging nozzle through which said mass is extruded as a solid bar, a fulcrum over which said bar passes, a rigid breaker arm for forcing said bar against said fulcrum to break said bar into sections of predetermined uniform size, and means for adjusting the relationship between said fulcrum and said breaker arm to vary the size of the sections broken off.

9. Apparatus for converting fragments of an ice into a solid bar, comprising, in combination, a plunger chamber for receiving said fragments, a nozzle operatively associated with said plunger chamber, a plunger for intermittently forcing said fragments from said plunger chamber into said nozzle to convert them into a solid mass, a feed chamber for feeding said fragments to said plunger chamber, and a tube connecting said plunger chamber and said feed chamber for removing air entering said plunger chamber with said fragments.

10. Apparatus for converting fragments of an ice into a solid mass comprising, in combination, a member having a tapered bore therethrough into which said fragments are forced, means for exerting a relatively large force on said fagments to force said fragments into and through said bore, said member and said force-exerting means acting to convert said fragments into a mass as the fragments pass through said bore, and yieldable resisting means engaging said mass after it leaves said bore and yieldable in response to force exerted by said mass for continuously exerting a relatively small force opposing the movement of said mass from said bore, whereby sufficient compressive force is brought to bear on said fragments within said bore by said force-exerting means and said member to consolidate said fragments.

11. Apparatus for converting fragments of an ice into a solid bar, comprising, in combination, a rigid nozzle through which said fragments are extruded, a plunger having a tapered bearing surface for forcing said fragments into said nozzle to convert them into a mass, and a resilient nozzle normally having a diameter smaller than that of said rigid nozzle associated with said rigid nozzle for applying sufficient force opposing the movement of said mass from said rigid nozzle to insure consolidation of said fragments within said rigid nozzle, said resilient nozzle being expanded by passage of said bar therethrough.

12. Apparatus for converting fragments of an ice into a solid mass, which comprises, in combination, a rigid tapered nozzle through which said mass is extruded, means for forcing the fragments into the said nozzle to convert them into a mass, and a rubber nozzle associated with said rigid nozzle and normally having a cross-sectional area less than the cross-sectional area of the discharge end of said rigid nozzle for applying sufficient force opposing the movement of said mass from said rigid nozzle to insure the conversion of said fragments within said rigid nozzle into said solid mass.

13. Apparatus for converting fragments of an ice into a solid mass comprising, in combination, a rigid tapered nozzle through which said mass is extruded, a plunger chamber, a plunger having a tapered bearing surface for forcing said fragments against the walls of said plunger chamber and into said nozzle to convert them into a mass, and yieldable resisting means engaging said mass after it leaves said nozzle for applying sufficient force opposing the movement of said mass from said nozzle to insure sufficient compressive force being built up on said fragments within said nozzle to consolidate said fragments.

14. Apparatus for converting fragments of an ice into a solid bar, comprising, in combination, a nozzle through which said bar is extruded, a plunger having a tapered bearing surface for forcing said fragments into said nozzle to convert them into a solid mass, and means for causing said plunger to rotate as it forces said fragments into said nozzle.

CROSBY FIELD.